United States Patent Office 3,349,129
Patented Oct. 24, 1967

3,349,129
DIFLUORAMINO-BUTANE-DIOL
Eugene L. Stogryn, Fords, and Perry A. Argabright and Ralph J. Leary, Cranford, N.J., assignors to Esso Research and Engineering Company, a corporation of Delaware
No Drawing. Filed Nov. 20, 1961, Ser. No. 154,390
5 Claims. (Cl. 260—584)

This invention relates to the synthesis of organic compounds that have high-energy $NF_2$ groups linked to carbon and reactive OH groups linked to carbon, as typified by the compound 2,3-bis(difluoramino)-butane-1,4-diol which has the following formula:

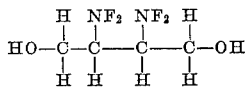

These organic compounds containing the C—$NF_2$ groups are propellant oxidizers; and when they contain hydroxyl groups, they are useful in forming polymeric binders that contribute to the energy value of a solid rocket propellant. The binders are used to hold other oxidizing and fuel ingredients of the propellant in the form of a solid grain.

The $NF_2$ groups attached to carbon atoms supply energy in the combustion of the propellant by acting as fluorine oxidizers which form products such as HF, metal fluorides, and metal oxyfluorides. The reactive OH or hydroxyl groups linked to carbon in the compounds having the C—$NF_2$ groups facilitate reactions of condensation, polymerization, or coupling with other compounds to form solid polymers that serve as high-energy binders. Accordingly, it has been found desirable to obtain suitable ingredients for preparing the monomeric compounds containing $NF_2$ groups and the hydroxyl functions.

The present invention provides a method and steps for the synthesis of the organic compounds containing $NF_2$ groups and hydroxyl functions safely and efficiently from available starting materials. For this purpose, the available starting materials may be unsaturated hydrocarbons that are easily converted to unsaturated alcohols, which in turn are easily converted to unsaturated acetoxy compounds.

The intermediate unsaturated acetoxy compounds are easily reacted with $N_2F_4$ to form the adducts in which C—$NF_2$ groups are present. The next important step in forming the hydroxyl groups from the acetoxy compounds is solved advantageously in accordance with the present invention by performing a methanolysis or alcoholysis reaction suitably catalyzed to permit the conversion of the acetoxy groups to hydroxyl groups without causing destruction of the C—$NF_2$ groups. The preservation of the C—$NF_2$ groups is very important.

Ordinary hydrolysis reactions were not found suitable. Also, many varieties of esterification and alcoholysis catalysts which are very effective with esters not containing the C—$NF_2$ grouping, e.g. tetrabutyl tin, dialkyl tin oxides, and alkyl titanates, were found unsuitable. In accordance with the present invention, an effective catalyst for carrying out the conversion of acetoxy groups to hydroxyl groups in compounds having the C—$NF_2$ groups is an aromatic sulfonic acid, e.g. paratoluene sulfonic acid, or a sulfonic acid resin, such as a sulfonated polystyrene in the acid form.

By use of the procedure herein described, a new route is opened for preparing the monomers having hydroxyl groups and C—$NF_2$ groups and for preparing novel compounds of this type as, for example, high purity 2,3-bis (difluoramino)-butane-1,4-diol. The preparation of this compound is illustrated by the following examples.

*Example.*—*Preparation of 2,3-bis($NF_2$)-1,4-diacetoxybutane*

1,4-diacetoxybutene-2 is a commercially available material which is readily made by the known steps of reacting butadiene-1,3 with chlorine to form 1,4-dichlorobutene-2, which in turn may be hydrolyzed to form the glycol that is next reacted with acetic anhydride to form the diacetate. The 1,4-dichlorobutene-2 may be reacted directly with sodium acetate to form the diacetate which is 1,4-diacetoxybutene-2. To form the bis($NF_2$) adduct of the diacetate mentioned, 3.2 grams of 1,4-diacetoxybutene-2 was reacted in 6 ml. of carbon tetrachloride with 8.97 g. of $N_2F_4$ in a 42 ml. stainless steel reactor. The reaction was carried out at 100° C. for 16 hours. After removing gases from the reaction vessel cooled to a temperature of —76° C., the remaining carbon tetrachloride solution was withdrawn with a pipette and subjected to vacuum distillation in a short-pass still to recover a distillate boiling at 85° to 92° C. under 0.005 mm. Hg. abs. pressure. This substance was analyzed and found to have the composition of 2,3-bis($NF_2$)-1,4-diacetoxybutane as shown by the following elemental analysis comparison:

$C_8H_{10}O_4N_2F_4$.—Found: F, 27.1%; N, 10.11%. Calculated: F, 27.5%; N, 10.14%.

*Example.*—*Preparation of 2,3-bis($NF_2$)-1,4-butane-diol*

For the methanolysis, 3.15 grams of 2,3-bis($NF_2$)-1,4-diacetoxybutane was dissolved in 6 ml. of methanol and heated under methanol reflux with 1 to 1.5 g. of a sulfonated polystyrene ion exchange resin (acid form) such as known under the name of Amberlite 112. Refluxing was continued for 1.5 to 2 hours while a mixture of methyl acetate and methanol was continuously removed by distillation from the reaction zone in which the methanol reacted with the acetoxy groups to form methyl acetate, thus replacing the acetoxy groups by hydroxyl groups. After the heating period was over, the reaction mixture was cooled and the solid sulfonated polystyrene catalyst was removed by filtration. Last traces of methanol were removed from the resulting viscous residue at reduced pressures. The remaining residual product was determined to have a structure and composition consistent with that of 2,3-bis($NF_2$)-1,4-butane-diol. Use of the solid sulfonated aromatic resin was found convenient for easy separation of the catalyst from the product, but reproducible results were obtained using p-toluene sulfonic acid as catalyst.

*Example.*—*Methanolysis with p-toluene sulfonic acid*

2,3-bis($NF_2$)-1,4-diacetoxybutane, 2.0 grams and 4 ml. of methanol were mixed with a catalytic amount of p-toluene sulfonic acid, and the mixture was placed in a reactor which was immersed in an oil bath preheated to 90° C. After 1 hour under total reflux, methyl acetate and methanol are distilled from the reaction mixture for a period of 1.5 hours. The remaining cooled product in methanol solution was treated with solid $NaHCO_3$ and filtered. After removal of the methanol from the product, the viscous residue was shaken with $CHCl_3$ and filtered to remove sodium p-toluene sulfonate which was formed from the reaction of the sodium bicarbonate with the catalyst. The chloroform extract yielded a viscous material, the infrared spectrum of which was consistent with the assigned structure of 2,3-bis($NF_2$)-1,4-butane-diol and a comparison of elemental analysis was made as follows.

Found: C, 26.95%; N,13.77%; F, 34.7%; F/N, 1.85%.
Calculated: C, 25.02%; N, 14.6%; F, 39.7%; F/N, 2.00%.

There was very little decomposition of the difluoroamino groups as evidenced by the observed F/N ratio.

The elemental analysis of the product obtained using the sulfonated polystyrene ion exchange resin was found by analysis to contain: percent C, 26.71; percent N, 14.98; percent F, 38.2; which is very close to the calculated analysis of $C_4H_8O_2N_2F_4$: percent C, 25.02; percent N, 14.6; percent F, 39.7. It is significant that the product obtained with the sulfonated aromatic ion exchange resin catalysis did not show a carbonyl peak and thus indicated quantitative conversion of the acetoxy groups to the hydroxyl groups.

The methanolysis reaction for converting the C—$NF_2$—containing acetate or acetoxy compound to the corresponding alcohol or diol is represented by the following reaction equation:

$$(CH_3COO)_nR + nCH_3OH \rightarrow R(OH)_n + nCH_3COOCH_3$$

wherein R represents a C—$NF_2$ group containing chain or nucleus, e.g. (a) —$CH_2CH(NF_2)CH(NF_2)CH_2$—; (b) $CH_2(NF_2)CH(NF_2)CH_2$—; (c)

—$CH_2CH(NF_2)CH(NF_2)CH(NF_2)CH(NF_2)CH_2$— and $n$ represents the number of acetoxy

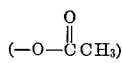

groups attached to the chain, generally, 1 or 2. In this generalized equation, the R chain in 2,3-bis($NF_2$)-1,4-diacetoxybutane is the divalent chain (a) which is linked at each end to an acetoxy group. The monovalent chain (b) is present in the bis($NF_2$) adduct of allyl acetate when it is reacted to form the bis($NF_2$) allyl alcohol adduct. The group (c) is present in the diacetate of a tetrakis-($NF_2$)-hexadiene adduct used for conversion to the corresponding diol. Up to the present time, the catalytic methanolysis method on the acetates containing C—$NF_2$ groups has worked more favorably on the adducts of aliphatic compounds rather than on the adducts of aromatic-type compounds or of unsaturated cyclic ether-type.

The C—$NF_2$ compounds having a reactive hydroxyl function are useful in the propellant art mainly for preparing high-energy binders, particularly those that can be used for casting. Such binders can be formed by reacting the compounds containing the reactive OH group with a diisocyanate, which may also contain C—$NF_2$ groups, to form polyurethanes containing these groups.

The general procedure used in preparing high-energy polyurethanes comprises reacting equimolar quantities of the diisocyanate and diol reactants at moderate temperatures of about 50° to 70° C. in an inert atmosphere for about 1 hour to form a low molecular weight oily prepolymer. Powdered fuels, e.g. B, Li, Al, Mg, Be, and their hydrides, and fluorine and oxygen oxidizers in the form of powdered solids and liquids are mixed with the prepolymer, and the mixture containing a suitable catalyst is then further stirred and maintained at a suitable moderate temperature until the mixture is set to a solid grain.

The $N_2F_4$ adduct of 2-butene-1,4-diisocyanate has been reacted with 2,3-bis($NF_2$)-butane-1,4-diol in accordance with the general procedure and as described in U.S. patent application, S.N. 154,391, filed Nov. 20, 1961, by R. J. Leary et al. The polymer obtained was found to have the composition corresponding to the recurrent unit formula ($C_{10}H_{14}O_4N_6F_8$). In compounding this prepolymer, the following is a typical formulation:

| Ingredient: | Weight percent |
|---|---|
| Tetrakis-($NF_2$)-tetrahydrofuran | 50 |
| Hydrazine nitroformate | 30–35 |
| Boron powder | 0–5 |
| Polyurethane binder | 15 |

The mixture of the ingredients with the prepolymer is preferably cured with the use of a catalyst such as dimethyl tin dichloride. The curing can be carried out during the casting at a moderate temperature of 50° C. The Isp value for this kind of propellant has been found to be in the range of 270–290.

The invention described is claimed as follows:

1. 2,3-bis(difluoroamino)-butane-1,4-diol having the formula:

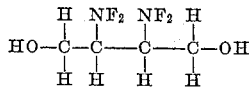

2. A process for preparing 2,3-bis($NF_2$)-butane-1,4-diol which comprises, reacting 2,3-bis($NF_2$)-1,4-diacetoxybutane with methanol in the presence of a catalytic amount of a sulfonated aromatic catalyst under conditions of methanol reflux to distill methanol with methyl acetate, said methyl acetate being a by-product formed during the reaction, separating catalyst from a resulting oily product having the composition of 2,3-bis(difluoramino)-butane-1,4-diol, and removing any remaining excess methanol from said oily product.

3. The process as defined in claim 2 wherein the catalyst is p-toluene sulfonic acid.

4. The process as defined in claim 2 wherein the catalyst is a sulfonated polystyrene resin in acid form.

5. The method of converting an aliphatic organic compound having C—$NF_2$ groups and an acetoxy group to the corresponding compound containing C—$NF_2$ groups with a hydroxyl group replacing said acetoxy group, said organic compound containing an acetoxy group having the formula:

$$(CH_3COO)_nR$$

wherein R represents a chain selected from the group consisting of (a) —$CH_2CH(NF_2)CH(NF_2)CH_2$—, (b) $CH_2(NF_2)CH(NF_2)CH_2$—, and (c)

—$CH_2CH(NF_2)CH(NF_2)CH(NF_2)CH(NF_2)CH_2$— and the subscript $n$ signifies 1 to 2 ($CH_3COO$) groups attached to the chain R depending on the valence of the chain, which comprises reacting said organic compound containing an acetoxy group with methanol under refluxing temperature conditions in the presence of a sulfonated aromatic catalyst to form methyl acetate and convert the acetoxy groups to hydroxyl groups, removing thus formed methyl acetate, said catalyst, and remaining unreacted methanol from the residual product which is the organic compound containing the C—$NF_2$ groups and hydroxyl groups replacing the acetoxy groups, and recovering said residual product.

No references cited.

CHARLES B. PARKER, *Primary Examiner.*
ROGER L. CAMPBELL, LEON D. ROSDOL,
*Examiners.*
J. W. WHISLER, *Assistant Examiner.*